(12) United States Patent
Haneda

(10) Patent No.: US 12,380,636 B2
(45) Date of Patent: Aug. 5, 2025

(54) STORAGE MEDIUM, INFORMATION PROCESSING SYSTEM, INFORMATION PROCESSING APPARATUS, AND INFORMATION PROCESSING METHOD

(71) Applicant: Nintendo Co., Ltd., Kyoto (JP)

(72) Inventor: Atsushi Haneda, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 161 days.

(21) Appl. No.: 18/116,014

(22) Filed: Mar. 1, 2023

(65) Prior Publication Data

US 2023/0281920 A1  Sep. 7, 2023

(30) Foreign Application Priority Data

Mar. 2, 2022 (JP) ................... 2022-031766

(51) Int. Cl.
*G06T 15/60* (2006.01)
*G06T 7/507* (2017.01)

(52) U.S. Cl.
CPC .............. *G06T 15/60* (2013.01); *G06T 7/507* (2017.01)

(58) Field of Classification Search
CPC .................................. G06T 15/60; G06T 7/507
See application file for complete search history.

(56) References Cited

U.S. PATENT DOCUMENTS

| | | | | |
|---|---|---|---|---|
| 2001/0001767 A1* | 5/2001 | Miyamoto | ............ | G06T 15/60 463/30 |
| 2002/0022517 A1 | 2/2002 | Tokuyama et al. | | |
| 2006/0046844 A1* | 3/2006 | Kaneko | ............ | A63F 13/40 463/32 |
| 2007/0132777 A1* | 6/2007 | Miyagi | ............ | A63F 13/525 345/592 |
| 2014/0160220 A1* | 6/2014 | Goldau | ............ | B41M 3/14 347/232 |
| 2016/0247314 A1* | 8/2016 | Park | ............ | G06T 15/60 |
| 2018/0040156 A1* | 2/2018 | Kondo | ............ | G06F 3/0484 |
| 2018/0330523 A1* | 11/2018 | Zhang | ............ | G06T 11/001 |
| 2019/0057544 A1* | 2/2019 | Lecocq | ............ | G06T 15/60 |
| 2019/0347849 A1* | 11/2019 | Chen | ............ | G06T 15/80 |
| 2020/0302675 A1* | 9/2020 | Story | ............ | G06T 15/06 |
| 2021/0200050 A1* | 7/2021 | Saeki | ............ | E06B 9/24 |

FOREIGN PATENT DOCUMENTS

| | | |
|---|---|---|
| JP | 2002-042165 | 2/2002 |
| JP | 2009-11567 | 1/2009 |
| JP | 2009-140135 | 6/2009 |
| JP | 2019-185281 | 10/2019 |

\* cited by examiner

*Primary Examiner* — Yi Yang

(74) *Attorney, Agent, or Firm* — Nixon & Vanderhye PC

(57) ABSTRACT

In a first area in a virtual space, an example of an information processing system renders a first shadow positioned in a first direction from an object, and a second shadow positioned in a second direction from the object. The information processing system renders a third shadow positioned in the second direction from the object, in a second area darker than a first reference area corresponding to a range in the first area. The information processing system renders the third shadow such that a color difference between a color in a second reference area corresponding to a range, in the second area, in which the third shadow is not positioned, and a color in the area of the third shadow is greater than a color difference between a color in the first reference area and a color in the area of the second shadow.

17 Claims, 15 Drawing Sheets

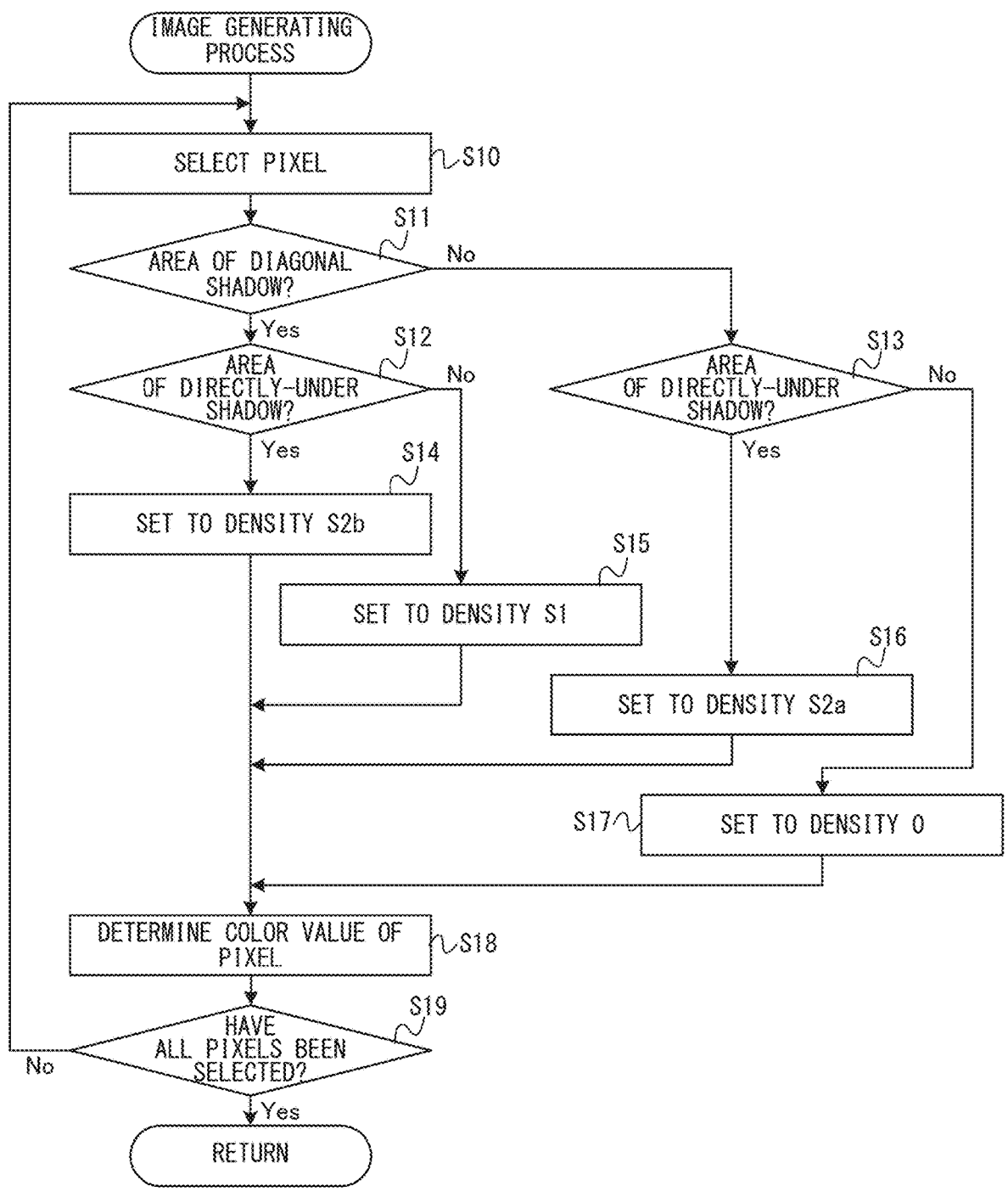

STORAGE MEDIUM, INFORMATION PROCESSING SYSTEM, INFORMATION PROCESSING APPARATUS, AND INFORMATION PROCESSING METHOD

CROSS REFERENCE TO RELATED APPLICATION

This application claims priority to Japanese Patent Application No. 2022-31766, filed on Mar. 2, 2022, the entire contents of which are incorporated herein by reference.

FIELD

The present disclosure relates to a storage medium, an information processing system, an information processing apparatus, and an information processing method for rendering shadows in a virtual space.

BACKGROUND AND SUMMARY

Conventionally, when rendering a shadow of an object in a virtual space, two types of shadows are displayed in different directions. In addition, when an object enters the shade of another object in the virtual space, shadows of the two objects are displayed in an overlapping manner.

When two types of shadows are generated as described above, it is desirable to improve visibility of the shadow that is rendered in a dark place in the virtual space (e.g., the shadow that is rendered so as to overlap a place in the shade of the other object).

Therefore, the present application discloses a storage medium, an information processing system, an information processing apparatus, and an information processing method capable of improving visibility of a shadow in a virtual space.

(1)

An example of a non-transitory computer-readable storage medium described herein stores instructions that, when executed by a processor of an information processing apparatus, cause the information processing apparatus to perform operations comprising: placing an object in a virtual space; in a first area in the virtual space, rendering a first shadow and a second shadow as shadows of an object, the first shadow being positioned in a first direction from the object, the second shadow being positioned in a second direction, different from the first direction, from the object; and rendering a third shadow as a shadow of the object in a second area darker than a first reference area, the third shadow being positioned in the second direction from the object, the first reference area corresponding to a range, in the first area in the virtual space, in which none of the first shadow and the second shadow are positioned. The third shadow is rendered such that a color difference between a color in a second reference area and a color in the area of the third shadow is greater than a color difference between a color in the first reference area and a color in the area of the second shadow, the second reference area corresponding to a range, in the second area, in which the third shadow is not positioned.

According to the configuration of the above (1), the third shadow in the second area darker than the first area is made easily viewable, thereby improving visibility of the shadow in the virtual space.

(2)

The second direction may be a direction closer to a downward direction of the virtual space than the first direction.

According to the configuration of the above (2), the second shadow and the third shadow allow the user to easily grasp the position of the object in the virtual space.

(3)

In the second area, as a shadow of the object, a shadow positioned in the first direction from the object does not have to be not rendered.

According to the configuration of the above (3), reality of the image representing the virtual space is improved.

(4)

A shielding object may be placed in the virtual space. As a shadow of the shielding object, a shielding shadow positioned in a third direction from the shielding object may be rendered. The second area may be an area of the shielding shadow of the shielding object.

According to the configuration of the above (4), visibility of the third shadow rendered in the area of the shadow of the shielding object is improved.

(5)

The first direction and the third direction may be the same direction.

According to the configuration of the above (5), since the shadows of the object and the shielding object are generated in the same direction, the reality of the image representing the virtual space is improved.

(6)

In a case where the object is positioned between the shielding object and the shielding shadow with respect to the first direction, the object may be rendered to be darker as compared to a case where the object is not positioned between the shielding object and the shielding shadow with respect to the first direction.

According to the configuration of the above (6), the reality of the image representing the virtual space is improved.

(7)

The first shadow may be rendered by a first method. The second shadow and the third shadow may be rendered by a second method. The second method may be a method that makes the shape of the rendered shadow thereby different from the shape of the shadow rendered by the first method, on an assumption that the shadows are rendered in the same direction.

According to the configuration of the above (7), the first shadow can be easily distinguished from the second and third shadows.

(8)

The first method may be a method that makes the shape of the rendered shadow resemble to the shape of the object, compared to the second method.

According to the configuration of the above (8), the first shadow can be more easily distinguished from the second and third shadows, and the reality of the image representing the virtual space is improved.

(9)

The first shadow may be rendered by a technique of depth shadowing. The second shadow and the third shadow may be rendered by a technique of capsule shadowing.

(10)

The first area and the second area may be parts of a ground in the virtual space. The object may move apart from the ground.

According to the configuration of the above (10), the second and third shadows allow the user to easy grasp the position of the object being apart from the ground.

(11)

An angle formed between the first direction and a downward direction of the virtual space may be greater than 0° and smaller than 90°. The second direction may be the downward direction of the virtual space.

According to the configuration of the above (11), the first shadow improves the reality of the image representing the virtual space, and the second and third shadows allow the user to easily grasp the position of the object regarding the horizontal direction.

(12)

The first shadow may be rendered so as to be darker than the second shadow.

According to the configuration of the above (12), the user can easily distinguish the first shadow from the second shadow by the densities thereof. Moreover, the possibility that the user feels strange about the two types of shadows is reduced.

(13)

The color difference may be obtained by color difference formula CIEDE2000.

The present specification discloses examples of an information processing apparatus and an information processing system that execute the processes in the above (1) to (13). Furthermore, the present specification discloses an example of an information processing method that executes the processes in the above (1) to (13).

According to the storage medium, the information processing system, the information processing apparatus, and the information processing method described above, it is possible to improve visibility of a shadow in a virtual space.

These and other objects, features, aspects and advantages of the exemplary embodiment will become more apparent from the following detailed description when taken in conjunction with the accompanying drawings.

BRIEF DESCRIPTION OF THE DRAWINGS

FIG. 15 is a sub flowchart showing an example of a specific flow of an image generating process in step S2 shown in FIG. 14.

DETAILED DESCRIPTION OF NON-LIMITING EXAMPLE EMBODIMENTS

1. Configuration of Game System

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
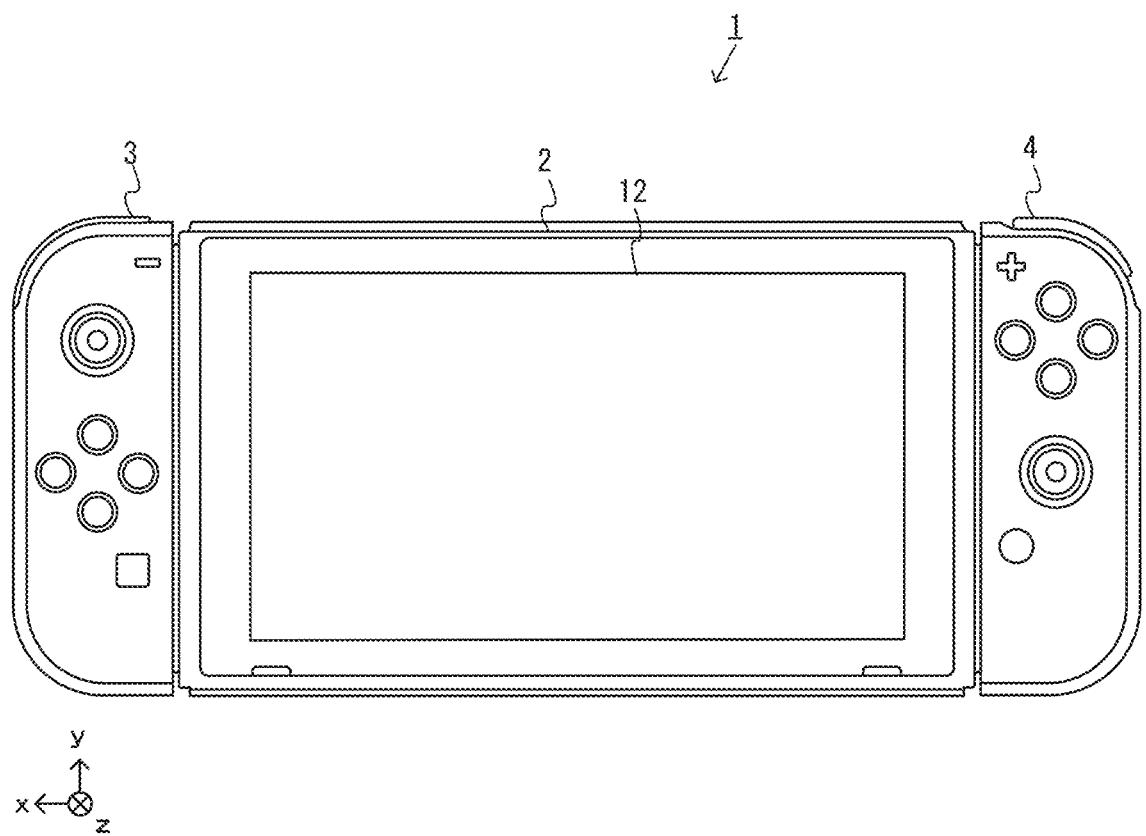
FIG. 1 is a view showing an example where a non-limiting left controller and a non-limiting right controller are attached to a non-limiting main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
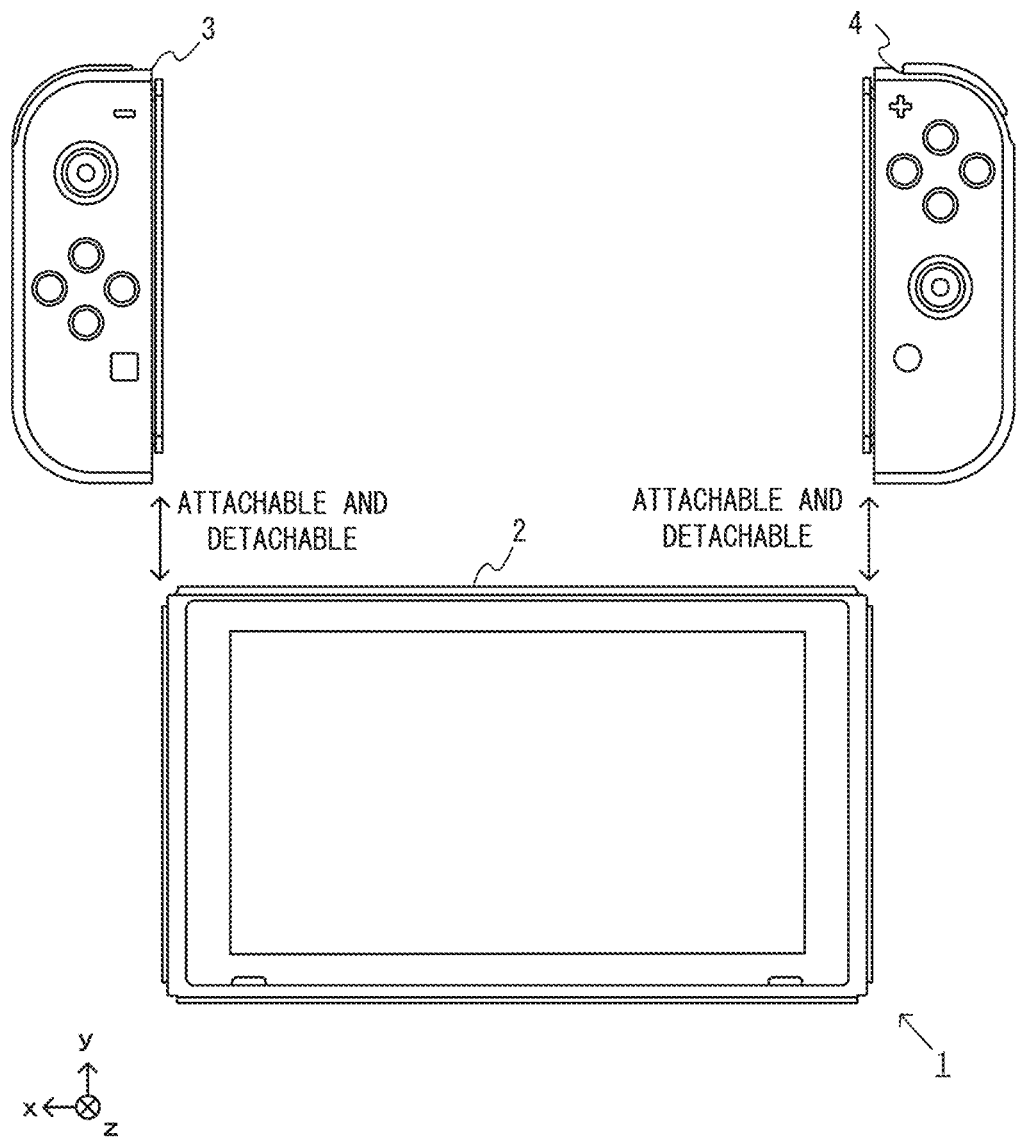
FIG. 2 is a view showing an example where a non-limiting left controller and a non-limiting right controller are removed from a non-limiting main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
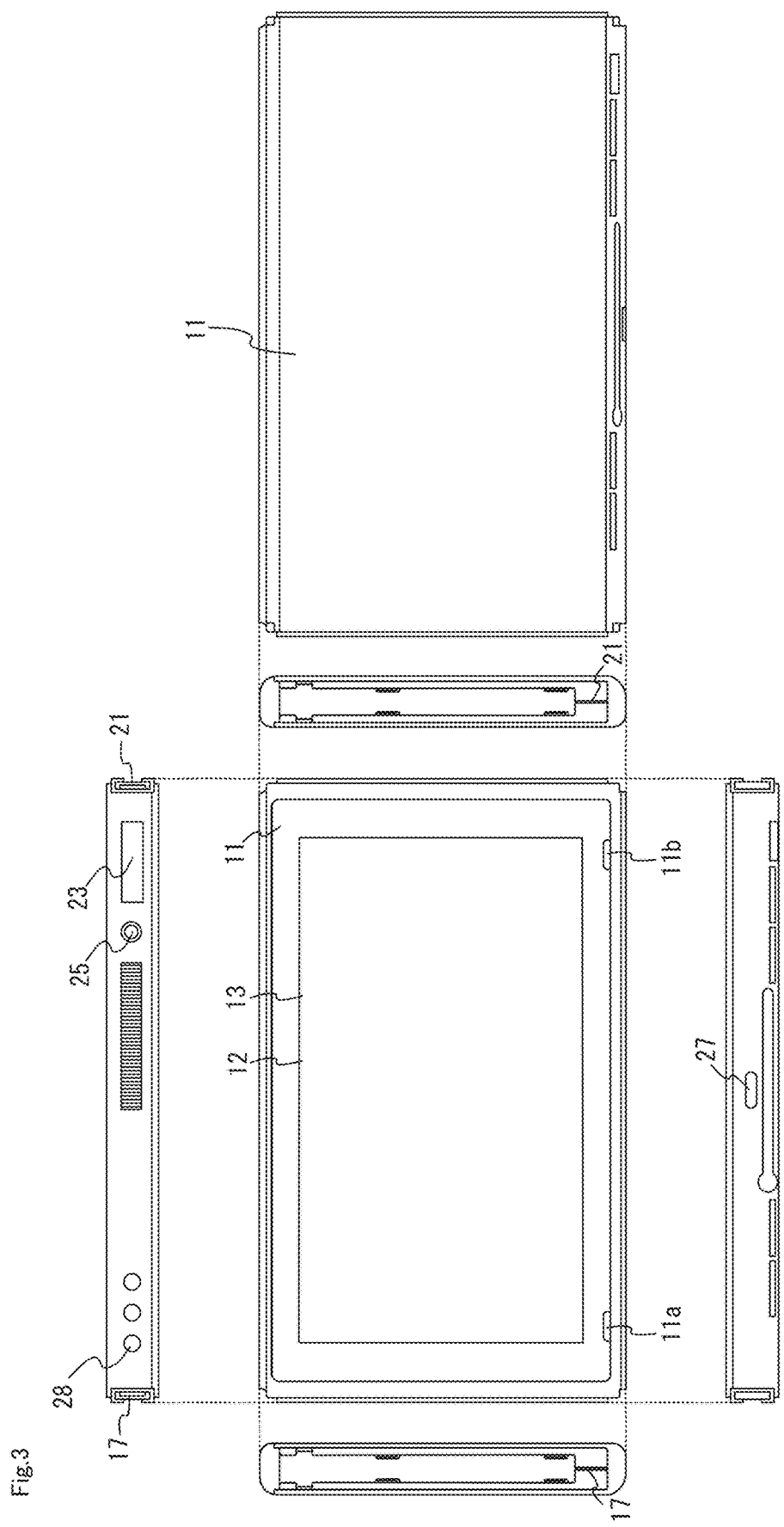
FIG. 3 is a six-sided view showing an example of a non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
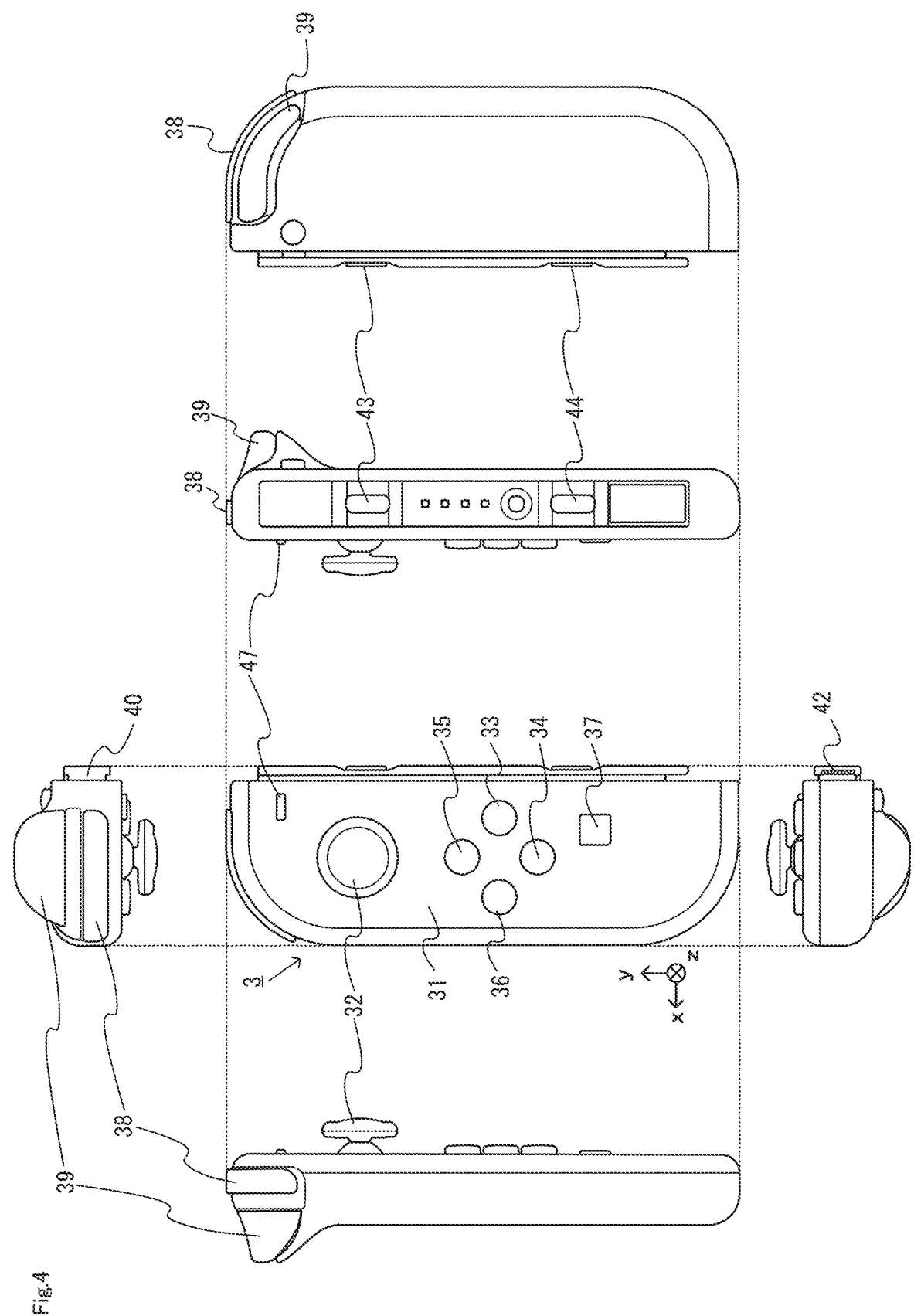
FIG. 4 is a six-sided view showing an example of a non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
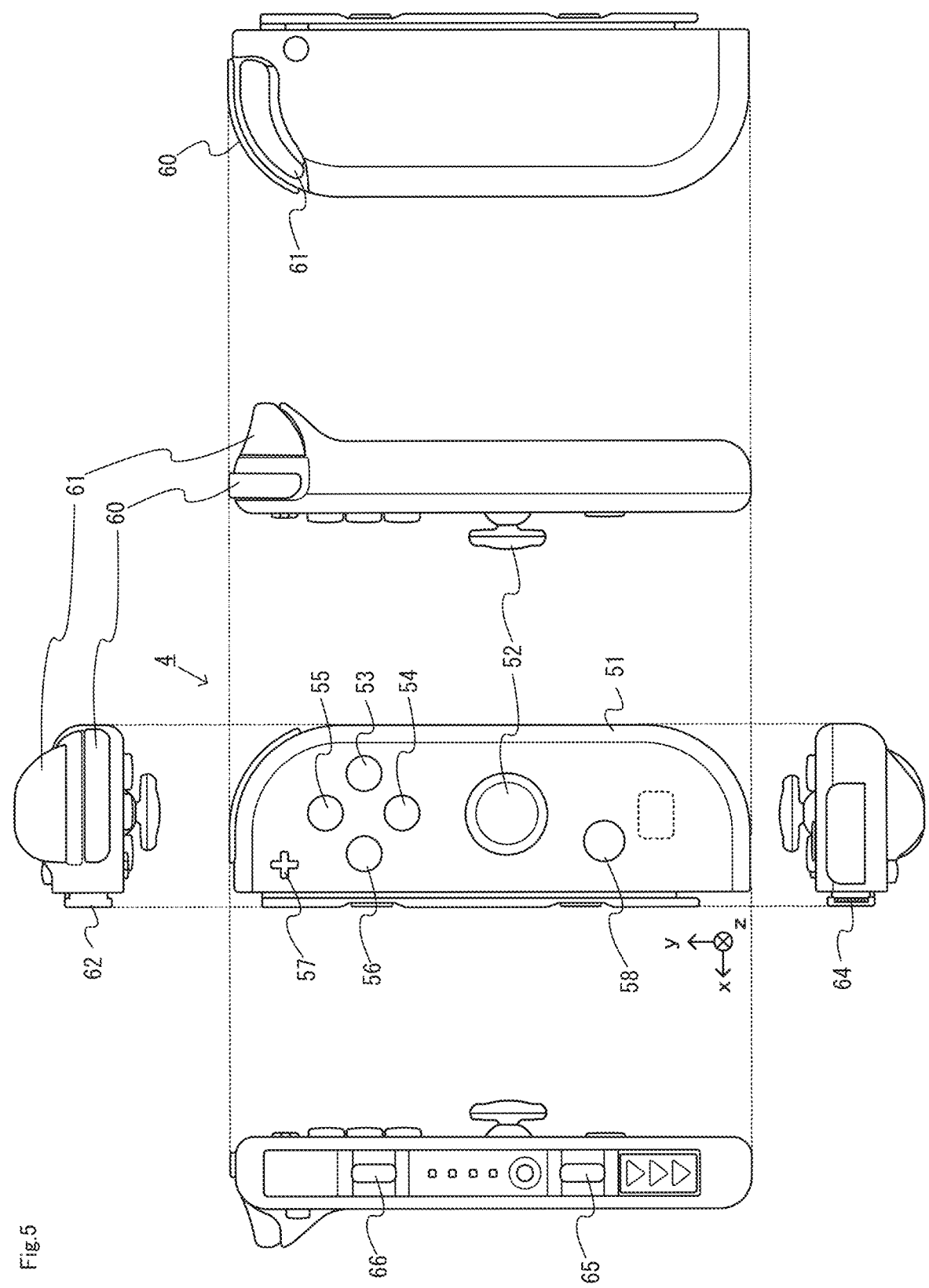
FIG. 5 is a six-sided view showing an example of a non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
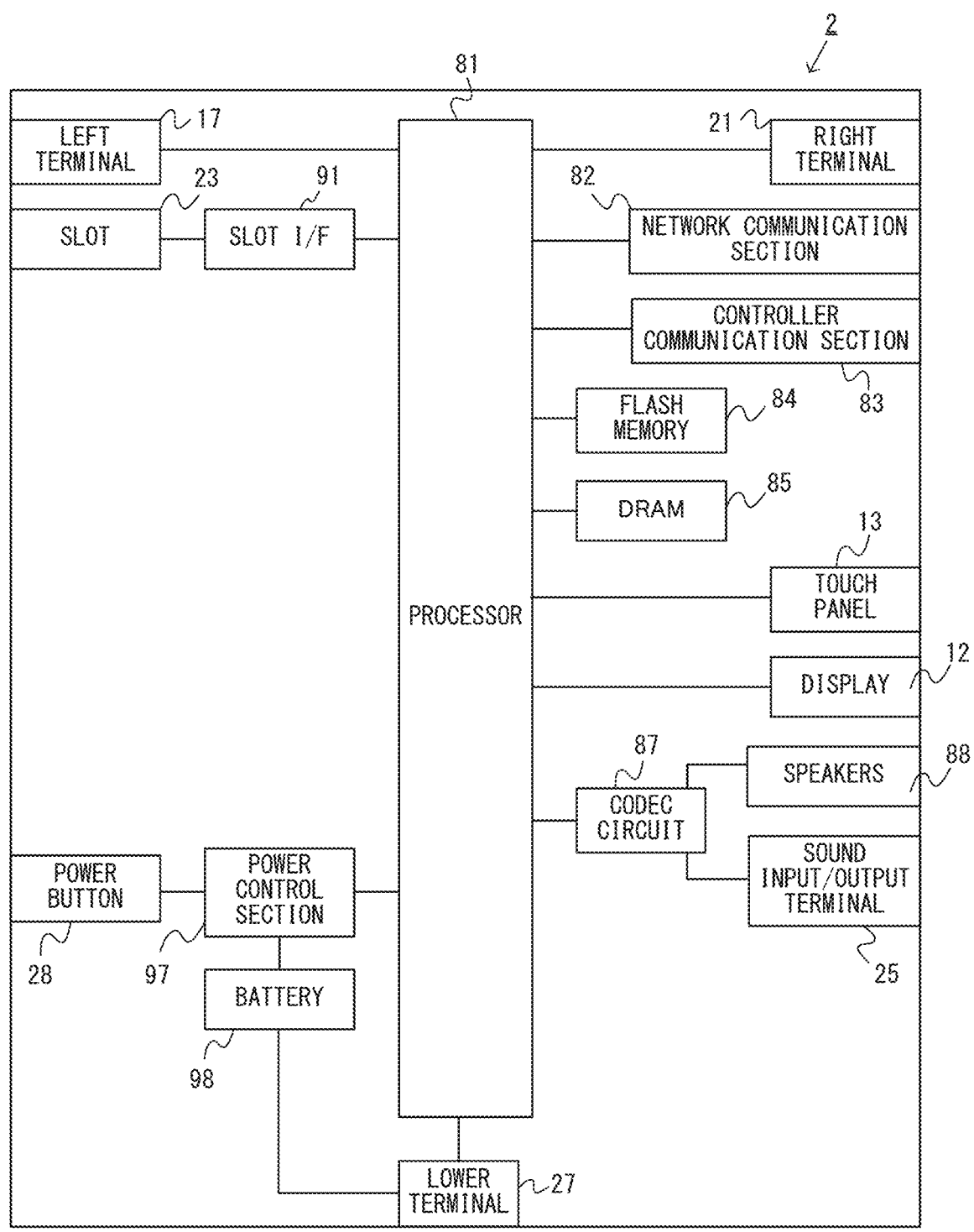
FIG. 6 is a block diagram showing an example of an internal configuration of a non-limiting main body apparatus.

FIG. 6 is a block diagram showing an example of the internal configuration of the main body apparatus 2. The main body apparatus 2 includes components 81 to 85, 87, 88, 91, 97, and 98 shown in FIG. 6 in addition to the components shown in FIG. 3. Some of the components 81 to 85, 87, 88, 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
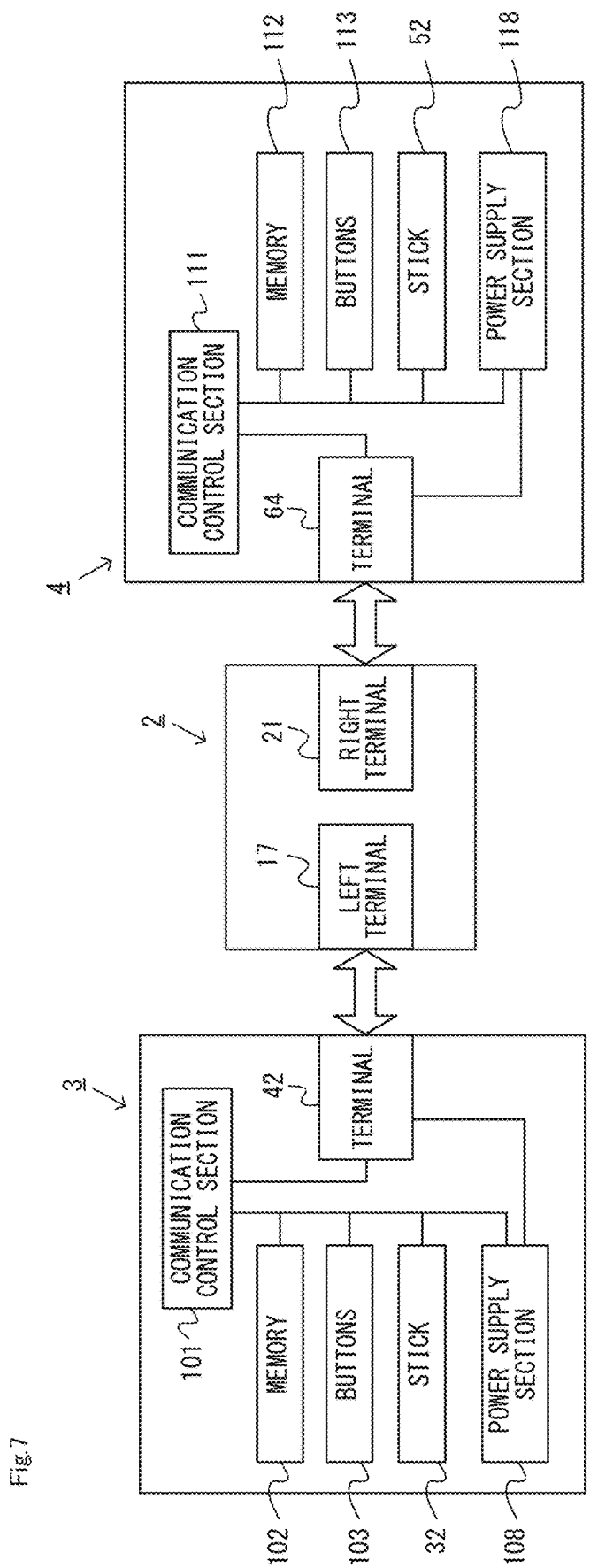
FIG. 7 is a block diagram showing an example of an internal configuration of a non-limiting main body apparatus, a non-limiting left controller and a non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103 and the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113 and the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

2. Outline of Processing in Game System

Next, an outline of processing executed in the game system 1 will be described with reference to FIG. 8 to FIG. 12. In the exemplary embodiment, when generating a game image representing a virtual space (or a game space), the game system 1 renders a shadow of an object to be placed in the virtual space. In the exemplary embodiment, as for a predetermined object, the game system 1 generates two types of shadows for one object. One of the two types of shadows is a shadow generated in a diagonal direction from the object according to the position of a light source, and the other type of shadow is a shadow generated in a directly downward direction from the object. Hereinafter, the former is referred to as a "diagonal shadow", and the latter is referred to as a "directly-under shadow".

Figure 8:
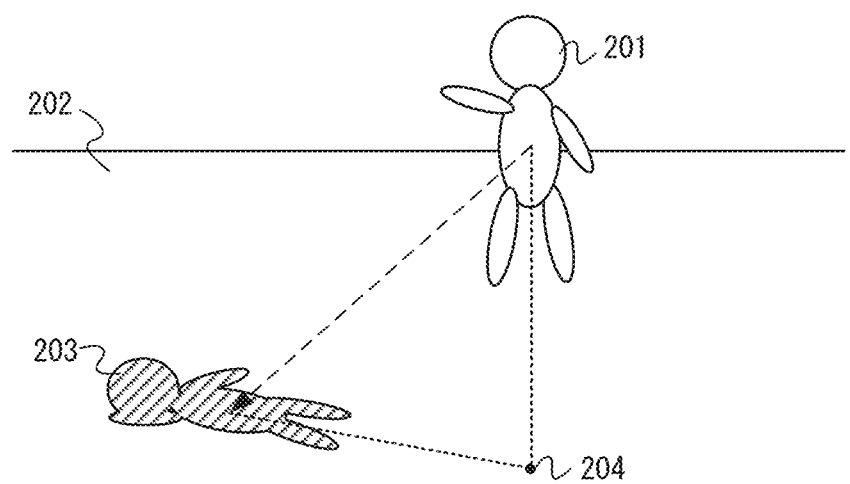
FIG. 8 shows an example of a diagonal shadow according to an exemplary embodiment.

FIG. 8 shows an example of the diagonal shadow in the exemplary embodiment. FIG. 8 shows an example in which a diagonal shadow 203 of an object 201 is generated on a ground 202 in the virtual space. In FIG. 8, in order to make the drawing easily viewable, the diagonal shadow is indicated by a hatched area (the same is true for diagonal shadows in FIG. 10 to FIG. 12).

The diagonal shadow 203 is generated at a position in a direction, from the object 201, according to a light source (e.g., the sun) set in the virtual space. That is, the diagonal shadow 203 is a shadow generated when the object 201 is projected onto the ground 202 in the direction from the light source to the object 201. The diagonal shadow 203 improves reality of the game image representing the virtual space.

In the exemplary embodiment, the game system 1 renders the diagonal shadow 203 by using a technique called depth shadowing. That is, the game system 1 determines, by using a shadow map, whether or not another object is present between the light source and a position (here, the ground) where rendering is to be performed. The game system 1 renders a shadow on the position if another object is present between the light source and the position, and does not render a shadow on the position if another object is not present between the light source and the position. Thus, the diagonal shadow 203 is generated so as to have a shape corresponding to the shape of the object 201 (see FIG. 8).

The technique of depth shadowing for generating the diagonal shadow 203 may be the same as the conventional technique. The diagonal shadow generating method is optional, and a diagonal shadow may be generated by another method. As the diagonal shadow generating method, the game system 1 may adopt any method by which a shadow having a shape corresponding to the shape of the object 201 is generated. In other embodiments, a diagonal shadow may be generated by a method of generating a shadow having a shape that does not correspond to the shape of the object 201.

As shown in FIG. 8, the diagonal shadow 203 is generated at a position different from a position 204 directly under the object 201. However, depending on the game situation (specifically, the position of the light source that depends on the game situation), the diagonal shadow 203 may be generated at a position overlapping the position 204 directly under the object 201. For example, the diagonal shadow 203 may be generated at the position 204 directly under the object 201 if it is noon in the game so that the sun as an example of the light source is positioned directly above the object 201.

In the exemplary embodiment, a density s1 of the diagonal shadow 203 is defined in the game program in advance. The density of a shadow is an index indicating the degree of reduction in brightness of a pixel corresponding to a position where the shadow is generated, from a normal brightness (i.e., a brightness when no shadow is rendered). For example, the brightness of the pixel corresponding to the position where the shadow is generated is calculated by the following formula (1).

(brightness of pixel corresponding to position where shadow is generated)=(normal brightness)×{1−(density of shadow)}     (1)

In the exemplary embodiment, the density of a shadow is a value in a range from not smaller than 0 to not greater than 1. The "normal brightness" indicates the brightness of the pixel in the case where neither a diagonal shadow nor a directly-under shadow is rendered at the pixel.

In other embodiments, the game system 1 may change the density s1 of the diagonal shadow 203 according to various situations in the virtual space. For example, when the intensity of light from the light source changes with time in the game, the density s1 of the diagonal shadow 203 may be changed according to the intensity of the light. For example, the density s1 of the diagonal shadow 203 may be changed according to a distance between the object 201 and a plane where the diagonal shadow 203 is generated (e.g., such that the diagonal shadow 203 is lightened as the distance increases). The density s1 of the diagonal shadow 203 may be set to different values depending on the color and/or the type of the ground where the diagonal shadow 203 is generated (e.g., whether the ground is soil or stone), or the type of the object 201.

In the exemplary embodiment, the density of the diagonal shadow 203 is set to a uniform value over the entire range of the diagonal shadow 203. Therefore, as for the diagonal shadow 203, assuming that the color (including the brightness) of the plane where the shadow is generated is constant, the shadow is render in a uniform color over the entire range to be the shadow. However, in other embodiments, the density of the diagonal shadow 203 may be set not to be uniform over the range to be the shadow, like a directly-under shadow described below.

Figure 9:
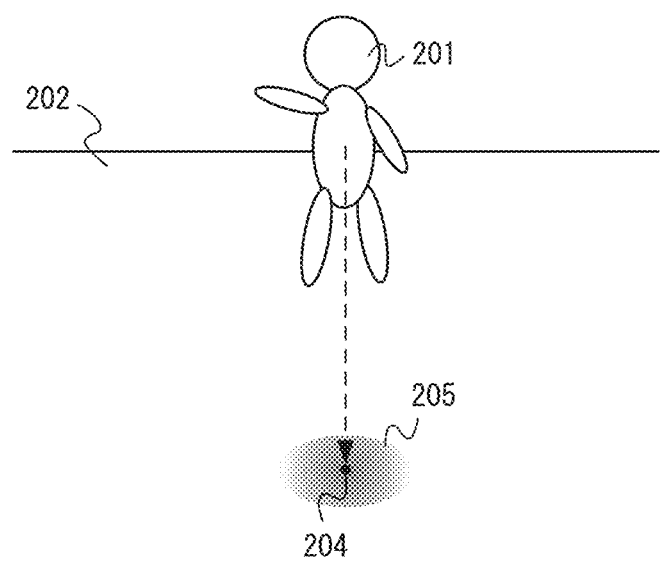
FIG. 9 shows a directly-under shadow according to the exemplary embodiment.

FIG. 9 shows an example of a directly-under shadow according to the exemplary embodiment. FIG. 9 shows an example in which a directly-under shadow 205 of the object 201 is generated on the ground 202 in the virtual space. The directly-under shadow 205 is generated at a position 204 which is present in the directly downward direction in the virtual space from the object 201. The directly-under shadow 205 allows the user to easily grasp the position of the object 201 with respect to the horizontal direction. For example, in the state where the object 201 is apart from the ground as shown in FIG. 9 (e.g., when the object 201 is jumping or floating), if only the diagonal shadow 203 is displayed, the user may not be able to grasp the position of the object 201 with respect to the horizontal direction. Meanwhile, since the game system 1 displays the directly-under shadow 205, the user can easily grasp the position.

In the exemplary embodiment, the directly-under shadow 205 is generated in the directly downward direction from the object 201. However, the directly-under shadow 205 may not strictly be positioned in the directly downward direction from the object 201. That is, the direction in which the directly-under shadow 205 is generated with respect to the object 201 may be any direction as long as the direction is closer to the downward direction of the virtual space than the direction in which the diagonal shadow 203 is generated with respect to the object 201, and may not strictly be the directly downward direction. For example, a center position of the directly-under shadow 205 may be shifted from the position 204 directly under the object 201, or the directly-under shadow 205 may be generated at a position not including the position 204 directly under the object 201 (e.g., a position in the vicinity of the position 204). Even in this case, as in the exemplary embodiment, the user can easily grasp the position of the object 201 with respect to the horizontal direction, compared to the case where only the diagonal shadow 203 is displayed. The phrase "the direction in which the directly-under shadow 205 is generated is a direction closer to the downward direction of the virtual space than the direction in which the diagonal shadow 203 is generated" means that an angle formed between the direction in which the directly-under shadow 205 is generated and the vertically downward direction of the virtual space is smaller than an angle formed between the direction in which the diagonal shadow 203 is generated and the vertically downward direction of the virtual space.

In the exemplary embodiment, the game system 1 renders the directly-under shadow 205 by using a technique called capsule shadowing. Here, capsule shadowing is a technique of rendering a shadow with the shape of an object being regarded as a simpler shape (e.g., a sphere shape or a capsule shape). In the exemplary embodiment, the game system 1 places an object for shadow generation having a predetermined shape (e.g., a capsule shape elongated in the up-down direction) at the position of the object 201, and an area obtained by projecting the object for shadow generation directly downward is regarded as an area of the directly-under shadow 205. Therefore, in the exemplary embodiment, the directly-under shadow 205 has a circular or elliptic shape (see FIG. 9). Using the technique of capsule shadowing, the game system 1 can reduce the processing load required for generation of the shadow.

The technique of capsule shadowing for generating the directly-under shadow 205 may be the same as the conventional technique. For example, in other embodiments, regarding the object for shadow generation described above, the game system 1 may determine whether or not to render a shadow, by using the same shadow map as that of the depth shadowing, thereby determining a range in which a shadow is rendered on the ground. Moreover, generation of the directly-under shadow 205 may be performed based on a light source (e.g., the sky, the direction of light of which is set to the directly downward direction of the virtual space), or may be performed not based on the light source. For example, regarding the area directly under the object 201, the game system 1 may display the directly-under shadow 205 by performing rendering using a texture representing the directly-under shadow 205. The method of generating the directly-under shadow 205 is optional. In other embodiments, the directly-under shadow 205 may be generated by the same method as the method of generating the diagonal shadow 203.

In the exemplary embodiment, a density s2 of the directly-under shadow 205 is determined in the game program in advance. Although described later in detail, in the exemplary embodiment, the game system 1 uses two kinds of values for the density of the directly-under shadow 205. Specifically, the game system 1 sets: a density s2a to be used when the directly-under shadow 205 is generated at a position not inside a diagonal shadow of another object (e.g., a diagonal shadow 207 of a wall object 206 described later) different from the object corresponding to the directly-under shadow 205 (i.e., the density of the directly-under shadow 205 in the sun (see FIG. 9 and FIG. 10)); and a density s2b to be used when the directly-under shadow 205 is generated at a position inside the diagonal shadow (i.e., the density of the directly-under shadow 205 in the shade (see FIG. 11)).

In the exemplary embodiment, the directly-under shadow 205 is render such that it is most dense at the center position (i.e., the position directly under the object 201) and is gradually lightened with the distance from the center position, within the range of the directly-under shadow 205 (see FIG. 9). That is, the game system 1 sets the density of the directly-under shadow 205 such that the shadow 205 is most dense at the center position and is gradually lightened with the distance from the center position. The density s2 (specifically, s2a and s2b) of the directly-under shadow 205 indicates the density at the center position of the directly-under shadow 205. In other embodiments, like the diagonal shadow 203, the directly-under shadow 205 may have a uniform density over the entire range to be the shadow.

Moreover, in other embodiments, the game system 1 may change the density s2 of the directly-under shadow 205 according to various situations in the virtual space. For example, the density s2 of the directly-under shadow 205 may be changed according to the distance between the object 201 and the plane where the directly-under shadow 205 is generated (e.g., such that the directly-under shadow 205 is lightened as the distance increases). The density s2 of the directly-under shadow 205 may be set to different values depending on the color and/or the type of the ground where the directly-under shadow 205 is generated, or the type of the object 201.

Figure 10:
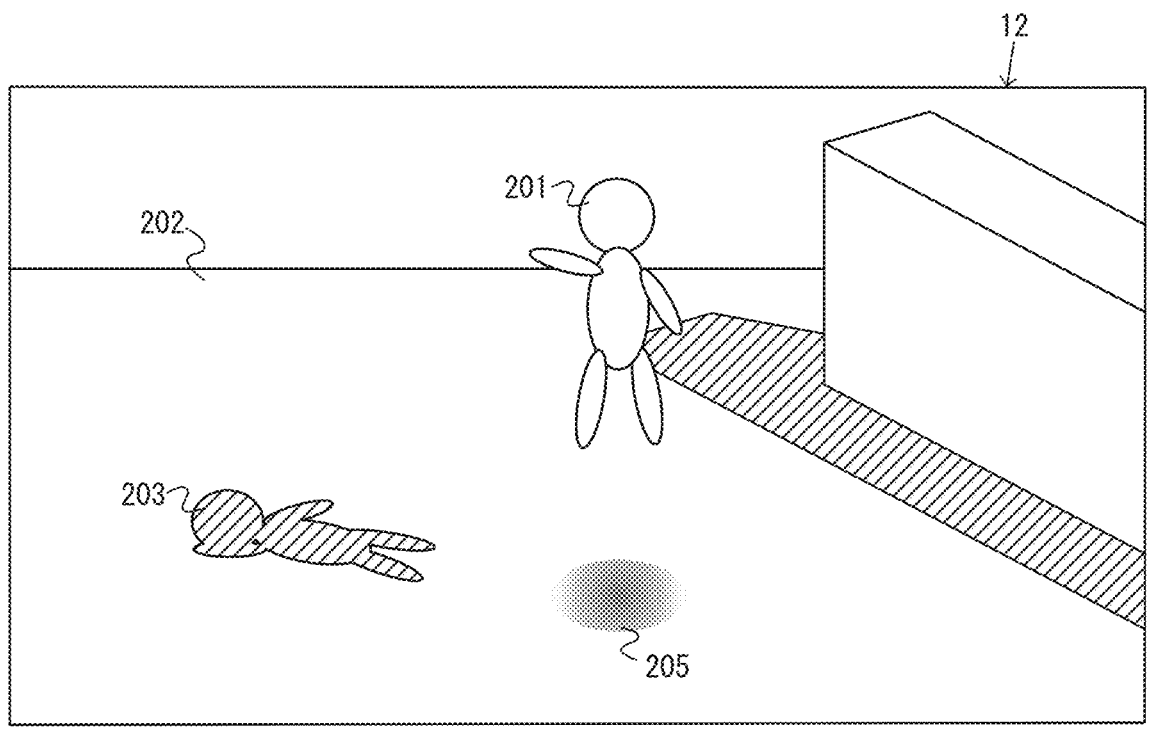
FIG. 10 shows an example of a game image in which a shadow of an object is rendered.

FIG. 10 shows an example of a game image in which shadows of an object are rendered. FIG. 10 shows the example of the game image in which the object 201 is positioned in the sun (i.e., the object 201 is not positioned in an area of a shadow of another object). When the object 201 is positioned in the sun as shown in FIG. 10, the diagonal shadow 203 and the directly-under shadow 205 are simultaneously displayed for one object 201.

As described above, in the exemplary embodiment, the game system 1 displays both the diagonal shadow 203 and the directly-under shadow 205 with respect to the object 201. The game system 1 displays the respective shadows 203 and 205 such that an angle formed between the direction of the diagonal shadow 203 with respect to the object 201 and the downward direction of the virtual space is greater than 0° and smaller than 90°, and the direction of the directly-under shadow 205 with respect to the object 201 is the downward direction of the virtual space (this downward direction is not limited to an exact directly downward direction as described above). In this case, the diagonal shadow 203 improves the reality of the game image, and the directly-under shadow 205 allows the user to easily grasp the position of the object 201 (specifically, the position with respect to the horizontal direction).

In the exemplary embodiment, when the object 201 is positioned in the sun, the game system 1 renders the diagonal shadow 203 to be more dense than the directly-under shadow 205. That is, in the exemplary embodiment, the game system 1 sets the density s1 of the diagonal shadow 203 to a value greater than the density s2a of the directly-under shadow 205 in the sun. If the density of the directly-under shadow 205 is equal to the density of the diagonal shadow 203, it might be difficult for the user to know, at a glance, a difference between the diagonal shadow 203 and the directly-under shadow 205 (although the shadows 203 and 205 are distinguishable because of their different shapes in the exemplary embodiment). Moreover, since the shadow is generated also in the direction (specifically, the directly downward direction) different from the direction according to the light source (e.g., the sun), the user might feel strange about the game image. Meanwhile, according to the exemplary embodiment, the user can easily distinguish the diagonal shadow 203 from the directly-under shadow 205 by the densities thereof. In addition, the directly-under shadow 205 being lighter than the diagonal shadow 203 reduces the possibility that the user feels strange about the game image. In other embodiments, the density of the diagonal shadow 203 and the density of the directly-under shadow 205 may be set to the same value, or the density of the diagonal shadow 203 may be set to be greater than the density of the directly-under shadow 205.

As shown in FIG. 10, the shape of the diagonal shadow 203 corresponds to the shape of the object 201, whereas the shape of the directly-under shadow 205 does not correspond to the shape of the object 201 which raises the left hand. Thus, in the exemplary embodiment, the game system 1 renders the directly-under shadow 205 by a method in which the shape of the shadow is determined by a manner different from that for the diagonal shadow 203. This provides an effect that the user can easily distinguish the diagonal shadow 203 from the directly-under shadow 205 by their shapes. Here, "two methods having different manners of determining the shape of a shadow" indicate methods that cause the shapes of generated shadows to be different from each other on the assumption that the shadows are generated in the same direction with respect to an object. In the exemplary embodiment, it can be said that the method of generating a diagonal shadow makes the shape of the generated shadow resemble to the shape of the object, compared to the method of generating a directly-under shadow. Thus, the reality of the diagonal shadow 203 can be further improved, thereby improving the reality of the game image.

The game system 1 can provide the above effect as long as at least the display modes (e.g., the densities, shapes, etc.) of the diagonal shadow 203 and the directly-under shadow 205 are different from each other. In other embodiments, the game system 1 may render the diagonal shadow 203 and the directly-under shadow 205 by methods having different manners of determining at least one of the density and the shape of a shadow. In other embodiments, the game system 1 may render the diagonal shadow 203 and the directly-under shadow 205 by the same method.

Figure 11:
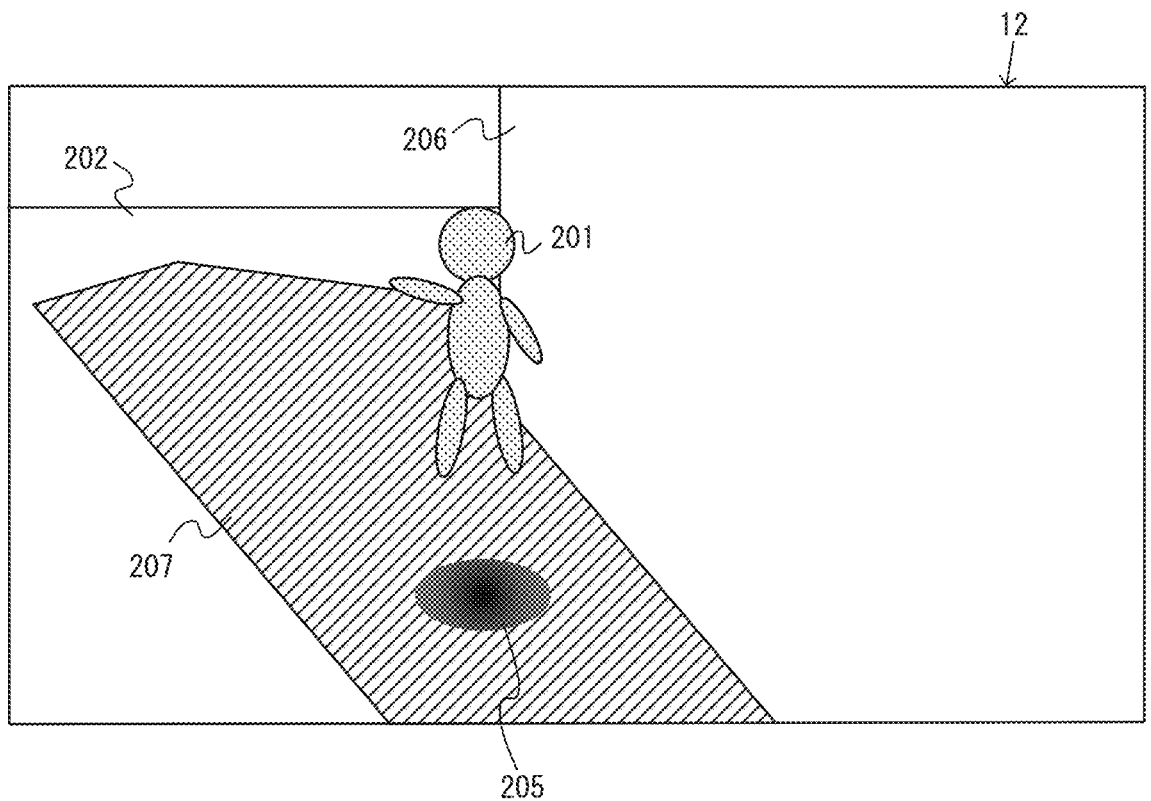
FIG. 11 shows another example of a game image in which a shadow of an object is rendered.

FIG. 11 shows another example of a game image in which a shadow of an object is rendered. FIG. 11 shows the example of the game image in which the object 201 is positioned in the shade. That is, in the example shown in FIG. 11, the object 201 is positioned in the shade of a wall object 206 placed in the virtual space. That is, the object 201 is positioned within an area of a diagonal shadow 207 of the wall object 206.

When the object 201 is positioned in the shade as shown in FIG. 11, the game system 1 does not render the diagonal shadow 203 of the object 201. That is, the game system 1 does not render a diagonal shadow of an object 201 in an area of a diagonal shadow of another object (in FIG. 11, the diagonal shadow 207 of the wall object 206). This improves the reality of the game image.

In other embodiments, the game system 1 may render the diagonal shadow 203 of the object 201 when the object 201 is positioned in the shade. In this case, for example, the density of the diagonal shadow 203 of the object 201 may be set to be greater (or less) than that of a diagonal shadow of another object present around the object 201 (in FIG. 11, the diagonal shadow 207).

Meanwhile, even when the object 201 is positioned in the shade, the game system 1 renders the directly-under shadow 205 of the object 201, as in the case where the object 201 is positioned in the sun. This allows the user to easily grasp the position of the object 201 even when the object 201 is positioned in the shade, as in the case where the object 201 is positioned in the sun.

Even when the object 201 is positioned in the shade, the game system 1 renders the directly-under shadow 205 in the same manner as that for the object 201 in the sun. That is, in the exemplary embodiment, even when the object 201 is positioned in the shade, the game system 1 renders the directly-under shadow 205 by using the technique of capsule shadowing as in the case where the object 201 is in the sun. Therefore, the position and the shape of the directly-under shadow 205 rendered when the object 201 is in the shade is the same as that in the case where the object 201 is in the sun.

In the exemplary embodiment, when the object 201 is in the shade, the game system 1 renders the directly-under shadow 205 by using a value of the density of the shadow (i.e., the shadow density s2b) different from that for the object 201 in the sun. Hereinafter, the density of the directly-under shadow will be described in detail with reference to FIG. 12.

Figure 12:
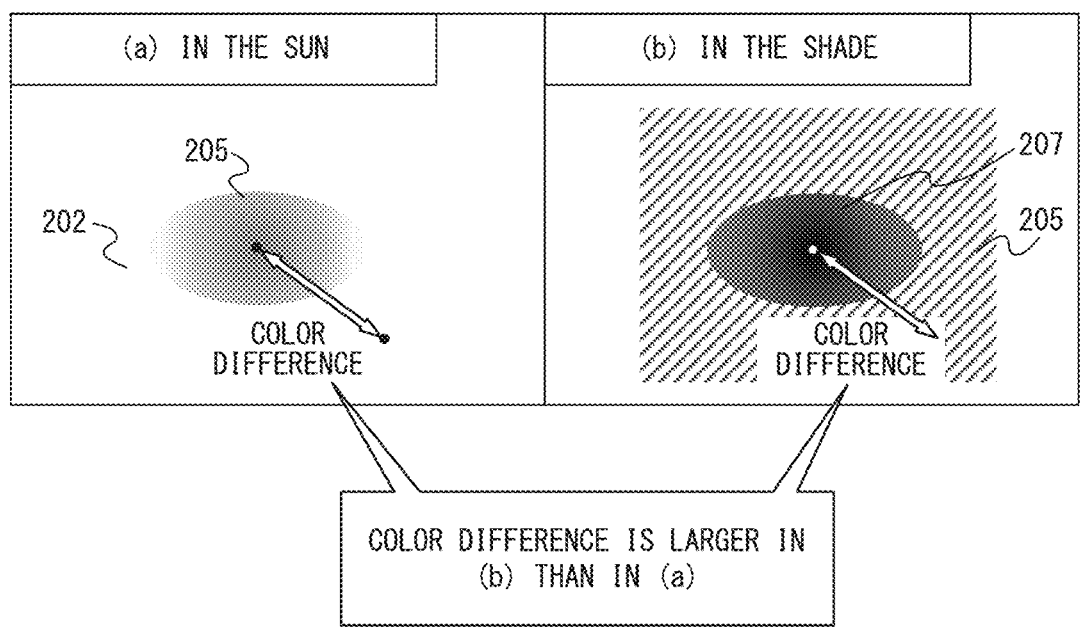
FIG. 12 shows examples of directly-under shadows in the sun and in the shade.

FIG. 12 shows examples of directly-under shadows 205 in the sun and in the shade. In the exemplary embodiment, the game system 1 sets the densities s2a and s2b of the directly-under shadow 205 so as to satisfy a condition that "(assuming that an area of a shadow and an area surrounding the shadow have the same color,) a color difference between the directly-under shadow 205 in the shade and the surrounding area (a color difference in (b) of FIG. 12) is greater than a color difference between the directly-under shadow 205 in the sun and the surrounding area (a color difference in (a) of FIG. 12)". In this case, the visibility of the directly-under shadow 205 of the object 201 in the shade can be improved.

The density s2a of the directly-under shadow 205 in the sun is set to be relatively less in order to reduce the possibility that the user feels strange about the presence of two shadows in the game image as described above. Meanwhile, in the situation where the directly-under shadow 205 in the shade is generated, the diagonal shadow 203 of the object 201 is not generated in many cases (because the diagonal shadow 203 of the object 201 is positioned in the shade of another object), and therefore, the possibility that the user feels strange about the game image is low even when the density s2b of the directly-under shadow 205 is increased. Therefore, in the exemplary embodiment, the color difference in the shade is made greater than that in the sun, whereby the visibility of the directly-under shadow 205 rendered in the shade is improved while suppressing strangeness in the game image when the directly-under shadow 205 is rendered in the sun.

As described above, in the exemplary embodiment, the density s2a of the directly-under shadow 205 in the sun is less than the density s1 of the diagonal shadow in the sun. Therefore, if the density s2b of the directly-under shadow 205 in the shade is made equal to or less than the density s2a of the directly-under shadow 205 in the sun, the directly-under shadow 205 in the shade is displayed to be less dense than that of the diagonal shadow 207 present around the shadow 205, which makes the game image unnatural. Therefore, the density s2b of the directly-under shadow 205 in the shade is set to a value that is greater than the density s2a of the directly-under shadow 205 in the sun (and that satisfies the above condition).

The color (specifically, RGB values) of each of pixels in the game image to be displayed is determined based not only on the value of shadow density but also on other factors. Examples of the other factors include: the type (i.e., texture) of a target (e.g., the ground) on which a shadow is rendered; and an influence of a light source applied to the target. The values of the densities s2a and s2b of the directly-under shadow 205 are determined such that the pixel color determined considering the other factors satisfies the above condition. For example, the values of the densities s2a and s2b of the directly-under shadow 205 may be set such that the above condition is satisfied when the color is determined with the influence of the light source (i.e., the sun) being considered when the shadow 205 is in the sun, and being not considered when the shadow 205 is in the shade. As for the target on which the shadow is rendered, the values of the densities s2a and s2b of the directly-under shadow 205 may be set such that the above condition is satisfied when the color is determined on the assumption that the shadow 205 in the sun and the shadow 205 in the shade are generated on the same target. Moreover, for example, when another light source (e.g., the sky) different from the above light source being the sun is further set, the color of each pixel may be determined taking these light sources into consideration. In this case, the game system 1 may determine the color of each pixel, taking into consideration, for each light source, influences on the density of the diagonal shadow and the density of the directly-under shadow. For example, the game system 1 determines the color of each pixel such that the light source being the sun is taken into consideration only when the shadow is in the sun while the light source being the sky is taken into consideration regardless of whether the shadow is in the sun or in the shade, and the values of the densities s2a and s2b of the directly-under shadow 205 may be set such that the above condition is satisfied when the color is thus determined. Moreover, as for the value of the density of each shadow, different values may be set for the shadow with respect to the light source being the sun and the shadow with respect to the light source being the sky. For example, the brightness of a part of the directly-under shadow in the sun may be obtained by adding a brightness calculated based on the brightness of the light source being the sun and the density s2a1 of the corresponding shadow, to a brightness calculated based on the brightness of the light source being the sky and the density s2a2 of the corresponding shadow.

For example, in the case where a shadow is rendered on a ground having a color (gray) of RGB (200, 200, 200) and the brightness of the ground in the sun is 200 (the maximum value is 255), the densities of a diagonal shadow and a directly-under shadow are set such that s1=0.4, s2a=0.2, and s2b=0.75, for example. In this case, the brightness of the areas of the diagonal shadows 203 and 207 is 120, the brightness of the directly-under shadow 205 in the sun is 160, and the brightness of the directly-under shadow 205 in the shade is 50. In this case, the color difference between the directly-under shadow 205 in the shade and the surrounding area is about twice as large as the color difference between the directly-under shadow 205 in the sun and the surrounding area, which satisfies the above condition. When the shadow densities s1, s2a, and s2b are set as described above, the color difference satisfies the above condition in many cases even if the color and the brightness of the ground are different from those described above.

The color difference described above is changed when the other factors are changed even if the values of the densities s2a and s2b of the directly-under shadow 205 are constant. The "other factors" include the density of a diagonal shadow if the density of the diagonal shadow is changeable, in addition to the type of a target on which a shadow is rendered and an influence of a light source applied to the target as described above. The game system 1 may not necessarily set the values of the densities s2a and s2b of the directly-under shadow so as to satisfy the above condition in all situation (i.e., irrespective of how the other factors described above change). The above condition may not be satisfied under a specific situation (e.g., a situation where the directly-under shadow 205 is rendered on a specific type of ground, or a situation where light from the light source is hardly applied and a black game space is displayed).

In other embodiments, in order to satisfy the above condition under a plurality of situations, the game system 1 may vary the value of the density of a directly-under shadow according to the situation where the directly-under shadow is generated (e.g., the texture of the ground on which the directly-under shadow is rendered, or the intensity of light from the light source). For example, the game system 1 sets, in advance, a first set of shadow densities (i.e., densities s2a and s2b) to be used when a directly-under shadow is rendered on the ground of soil, and a second set of shadow densities (i.e., densities s2a' and s2b') to be used when a directly-under shadow is rendered on the ground of stone. The game system 1 may selectively use the first set and the second set according to the type of the ground (i.e., whether the ground is soil or stone).

In other embodiments, when the color of a pixel corresponding to an area of a directly-under shadow does not satisfy the above condition, the game system 1 may change the density of the directly-under shadow so as to satisfy the above condition. Specifically, the game system 1 sets, as reference values of the density of a directly-under shadow, a value of the density of the shadow in the sun and a value of the density of the directly-under shadow in the shade. If the above condition is not satisfied when the color of the pixel is determined based on the reference value, the game system 1 changes the value of the density from the reference value so as to satisfy the above condition (e.g., changes the value of the density of the shadow in the shade to a greater value). The game system 1 again determines the color of the pixel by using the changed value of the density, thereby setting the density of the directly-under shadow so as to satisfy the above condition. Thus, even when the above condition is not satisfied with the reference value for the density prepared in advance, the directly-under shadow can be rendered so as to satisfy the condition.

The color difference is obtained by using color difference formula CIEDE2000, for example. The color difference calculation method is not limited thereto, and a color difference calculated by any conventional calculation method, such as CIE1976, CIE1994, or CMC, may be used.

In the exemplary embodiment, the game system 1 determines, for each pixel in the game image, which of the density s2a of the directly-under shadow 205 in the sun and the density s2b of the directly-under shadow 205 in the shade, should be used as the value of the shadow density of the directly-under shadow 205 (see FIG. 15). That is, when a position, in the virtual space, corresponding to the pixel is a position within an area in the sun (i.e., a position outside an area of a diagonal shadow), the game system 1 determines the color of this pixel, based on the density s2a. Meanwhile, when a position, in the virtual space, corresponding to the pixel is a position within an area in the shade (i.e., a position inside an area of a diagonal shadow), the game system 1 determines the color of this pixel, based on the density s2b. Thus, in the exemplary embodiment, the game system 1 determines, for each pixel, whether the pixel is in the area in the sun or in the area in the shade, and determines the density of the directly-under shadow 205. Therefore, for example, when the directly-under shadow 205 lies over the area in the sun and the area in the shade (i.e., when a part of the directly-under shadow 205 is in the area in the sun while the remaining part is in the area in the shade), the directly-under shadow 205 in the area in the sun is rendered based on the density s2a while the directly-under shadow 205 in the area in the shade is rendered based on the density s2b. Therefore, a relatively light shadow is displayed as the part of the directly-under shadow 205 in the sun while a relatively dark shadow is displayed as the part of the directly-under shadow 205 in the shade. Thus, in the exemplary embodiment, even in the above case, the directly-under shadow 205 can be displayed to be easily viewable.

In the exemplary embodiment, the game system 1 generates a directly-under shadow for an object that moves apart from the ground (e.g., jumps, or flies in the air) among various types of objects arranged in the virtual space. The object for which the directly-under shadow is generated is, for example, a player character operated by the user and/or a character (e.g., an enemy character) whose motion is controlled by the game program. In this case, the game system 1 allows the user to easily grasp the position regarding the object that moves apart from the ground. Moreover, since the game system 1 need not perform a process of generating a directly-under shadow for an object for which a directly-under shadow is less required (e.g., an object that is placed on the ground and does not move, or a terrain object such as a wall), the processing load can be reduced. The game system 1 need not generate a directly-under shadow for every object that moves apart from the ground, and may not generate a directly-under shadow for a specific object. The type of an object for which a directly-under shadow should be generated is optional. In other embodiments, the game system 1 may generate a directly-under shadow for an object that does not move, for example.

As shown in FIG. 11, in the exemplary embodiment, when the object 201 is positioned in the shade, the game system 1 renders the object 201 to be darker, compared to the case where the object 201 is positioned in the sun. That is, when the object 201 is positioned between the wall object 206 and the diagonal shadow 207 of the wall object with respect to the direction of the diagonal shadow (i.e., when the object 201 is positioned in the shade of the wall object 206), the game system 1 renders the object 201 to be darker, compared to the case where the object 201 is not positioned between the wall object 206 and the diagonal shadow 207 of the wall object with respect to the direction. Thus, the reality of the game image can be further improved.

In other embodiments, even when the object 201 is positioned in the shade, the game system 1 may render the object 201 in the same manner as in the case where the object 201 is positioned in the sun (i.e., without changing the brightness). Thus, the visibility of the object 201 can be improved.

3. Specific Example of Processing in Game System

Figure 13:
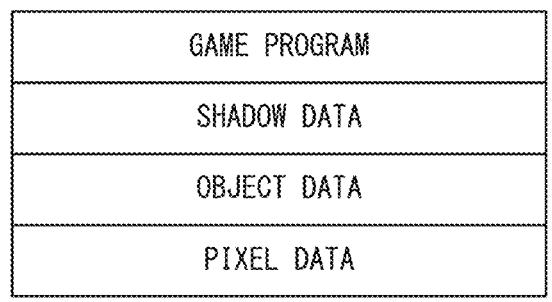
FIG. 13 shows an example of various data used in information processing in a non-limiting game system.

Next, a specific example of information processing in the game system 1 will be described with reference to FIG. 13 to FIG. 15. FIG. 13 shows an example of various data used for the information processing in the game system 1. The various data shown in FIG. 13 are stored in a storage medium (e.g., the flash memory 84, the DRAM 85, and/or the memory card attached to the slot 23) accessible by the main body apparatus 2.

As shown in FIG. 13, the game system 1 has a game program stored therein. The game program is a program for executing game processing (specifically, processes shown in FIG. 14 and FIG. 15) in the exemplary embodiment. The game system 1 has, stored therein, shadow data, object data, and pixel data.

The shadow data represents the densities of the diagonal shadow and the directly-under shadow described above. In the exemplary embodiment, the shadow data includes data representing the density s1 of the diagonal shadow and the densities s2a and s2b of the directly-under shadow. The shadow data may be included in the game program.

The object data is data regarding an object that is placed in the virtual space and for which a shadow is generated (e.g., the object 201 shown in FIG. 8, etc.). For example, the object data includes data representing the position, shape, posture, etc., of the object.

The pixel data represents the color of each pixel in the game image. The game system 1 stores the pixel data in a frame buffer disposed in the storage medium, for example.

Figure 14:
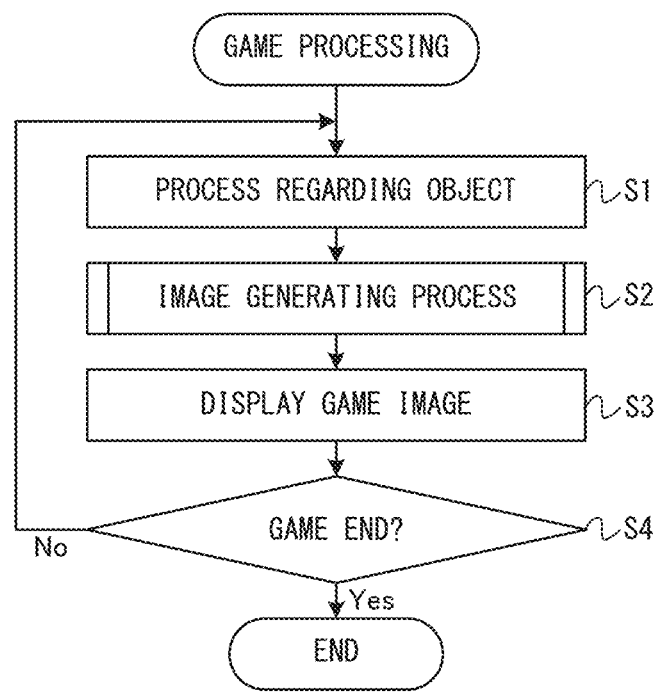
FIG. 14 is a flowchart showing an example of a flow of game processing executed in a non-limiting game system.

FIG. 14 is a flowchart showing an example of a flow of game processing executed by the game system 1. The game processing is started when an instruction to start the game has been made by a player during execution of the game program.

In the exemplary embodiment, the processor 81 of the main body apparatus 2 executes the game program stored in the game system 1 to execute the processes in steps shown in FIG. 14 and FIG. 15. However, in other embodiments, a part of the processes in the steps may be executed by a processor (e.g., a dedicated circuit, etc.) other than the processor 81. Furthermore, if the game system 1 is communicable with another information processing apparatus (e.g., a server), a part of the processes in the steps shown in FIG. 14 and FIG. 15 may be executed by the another information processing apparatus. The processes in the steps shown in FIG. 14 and FIG. 15 are merely examples, and the processing order of the steps may be changed or another process may be executed in addition to (or instead of) the processes in the steps as long as similar results can be obtained.

The processor 81 executes the processes in the steps shown in FIG. 14 and FIG. 15 by using a memory (e.g., the DRAM 85). That is, the processor 81 stores information (in other words, data) obtained in each process step into the memory, and reads out the information from the memory when using the information for the subsequent process steps.

In step S1 shown in FIG. 14, the processor 81 executes a process regarding an object for which a shadow is generated. Specifically, the processor 81 places the object in the virtual space, and controls the motion of the object placed in the virtual space. For example, the processor 81 places the object (or causes the object to appear) in the virtual space when a predetermined appearance condition has been satisfied. When the object is a player character, the processor 81 acquires, at an appropriate timing, operation data received from the controllers via the controller communication section 83 and/or the terminals 17 and 21, and causes the object to move and perform an action in the virtual space, based on the acquired operation data. Meanwhile, when the object is a non-player character (e.g., an enemy character), the processor 81 causes the object to move and perform an action in the virtual space, based on an algorithm defined in advance in the game program. Furthermore, the processor 81 updates the content of the object data stored in the storage medium such that the object data indicates the state after the process in step S1. Next to step S1, the process in step S2 is executed.

In step S2, the processor 81 performs an image generating process for generating a game image. The processor 81 repeatedly executes a process loop of steps S1 to S4 such that the process in step S2 is executed once every predetermined time (e.g., 1 frame time). Hereinafter, the image generating process will be described in detail with reference to FIG. 15.

FIG. 15 is a sub flowchart showing an example of a specific flow of the image generating process in step S2 shown in FIG. 14. In the image generating process, first, in step S10, the processor 81 selects one of a plurality of pixels constituting the game image. Specifically, the processor 81 selects, in a predetermined order, a pixel that has not been selected in the process loop of steps S10 to S19 in the current image generating process, from among the plurality of pixels. Next to step S10, the process in step S11 is executed.

In step S11, the processor 81 determines whether or not a position, in the virtual space, corresponding to the pixel selected in step S10 is within an area of a diagonal shadow. The determination in step S11 is performed by determining, with a shadow map, whether or not an object is present between a light source of the diagonal shadow and the position. When an object is present between the light source of the diagonal shadow and the position, the processor 81 determines that the position is within the area of the diagonal shadow. When no object is present between the light source of the diagonal shadow and the position, the processor 81 determines that the position is not within the area of the diagonal shadow. When the determination result in step S11 is positive, the process in step S12 is executed. When the determination result in step S11 is negative, the process in step S13 is executed.

In step S12, the processor 81 determines whether or not the position, in the virtual space, corresponding to the pixel selected in step S10 is within an area of a directly-under shadow. For example, when the position is directly under an object for shadow generation corresponding to the object for which a shadow is generated, and another object is not present between the position and the object for shadow generation, the processor 81 determines that the position is within the area of the directly-under shadow. Meanwhile, when the position is not directly under the object for shadow generation corresponding to the object for which a shadow is generated or when another object is present between the position and the object for shadow generation, the processor 81 determines that the position is not within the area of the directly-under shadow. When the determination result in step S12 is positive, the process in step S14 described later is executed. When the determination result in step S12 is negative, the process in step S15 described later is executed.

In step S13, the processor 81 performs a determination similar to the determination in step S12. When the determination result in step S13 is positive, the process in step S16 described later is executed. When the determination result in step S13 is negative, the process in step S17 described later is executed.

In step S14, the processor 81 sets a shadow density to be applied to the pixel selected in step S10, to the density s2b of the directly-under shadow in the shade. The process in step S14 is executed when the position corresponding to the pixel is within the area of the diagonal shadow and within the area of the directly-under shadow. Since the position is within the area of the directly-under shadow in the shade, the processor 81 sets a shadow density to be applied to the pixel to the density s2b, with reference to the shadow data described above. Next to step S14, the process in step S18 described later is executed.

In step S15, the processor 81 sets a shadow density to be applied to the pixel selected in step S10, to the density s1 of the diagonal shadow. The process in step S15 is executed when the position corresponding to the pixel is within the area of the diagonal shadow and is not within the area of the directly-under shadow. Therefore, the processor 81 sets a shadow density to be applied to the pixel, to the density s1 of the diagonal shadow, with reference to the shadow data described above. Next to step S15, the process in step S18 described later is executed.

In step S16, the processor 81 sets a shadow density to be applied to the pixel selected in step S10, to the density s2a of the directly-under shadow in the sun. The process in step S16 is executed when the position corresponding to the pixel is not within the area of the diagonal shadow and is within the area of the directly-under shadow. Since the position is within the area of the directly-under shadow in the sun, the processor 81 sets a shadow density to be applied to the pixel to the density s2a, with reference to the shadow data described above. Next to step S16, the process in step S18 described later is executed.

In step S17, the processor 81 sets a shadow density to be applied to the pixel selected in step S10, to a value indicating that there is no shadow (i.e., 0). The process in step S17 is executed when the position corresponding to the pixel is not within the diagonal shadow and is not within the area of the directly-under shadow. Therefore, the shadow density of this position is set to 0. Next to step S17, the process in step S18 is executed.

In step S18, the processor 81 determines a color (e.g., RGB values) of the pixel selected in step S10. Specifically, the processor 81 determines a color of this pixel in a case where no shadow is rendered, based on a texture or the like to be applied to the position corresponding to the pixel. The method of determining the color is optional, and may be the same as the conventional method. Next, the processor 81 changes the color of the pixel, based on the shadow density set in any of the above steps S14 to S17. For example, the processor 81 changes the brightness of the pixel, based on the shadow density set in any of steps S14 to S17 (specifically, the processor 81 reduces the brightness of the pixel (see formula (1) described above)). The processor 81 changes the color of the pixel such that the pixel has the changed brightness. When using the density s2a or s2b of the directly-under shadow in step S18, the processor 81 corrects the value of the shadow density according to a distance from the center position of the directly-under shadow to the position corresponding to the pixel (specifically, the processor 81 reduces the shadow density), and changes the color by using the corrected value. Thus, the directly-under shadow is rendered such that it is most dense at the center position and is gradually lightened with the distance from the center position (see FIG. 9). When the position corresponding to the pixel is the position of an object and the object is positioned in the shade, the processor 81 determines the color of the pixel so as to be darker, compared to the case where the object is positioned in the sun. The processor 81 updates the pixel data such that the pixel data indicates the color obtained as described above. Next to step S18, the process in step S19 is executed.

In step S18, the processor 81 calculates, for each pixel in the game image, the color of the pixel before a shadow is rendered, and the color of the pixel after the shadow has been rendered. In other embodiments, regarding the process in step 18, the processor 81 may firstly generate a game image in a case where no shadow is rendered (i.e., determine the color of each pixel in the game image), and thereafter may render a shadow in the game image by executing the process in step S18 for each pixel.

In other embodiments, the processor 81 may execute, as image generating processes, a process of rendering a diagonal shadow and a process of rendering a directly-under shadow separately from each other. That is, as for the process of rendering a diagonal shadow, the processor 81 executes, for each pixel in the game image, a process of changing the color of the pixel by using the density s1 of the diagonal shadow when the position corresponding to the pixel is within the area of the diagonal shadow. Furthermore, the processor 81 executes a process of rendering a directly-under shadow in the game image in which the diagonal shadow is rendered. That is, as for the process of rendering the directly-under shadow, the processor 81 executes, for each pixel in the game image, a process of changing the color of the pixel by using the density s2a of the directly-under shadow when the position corresponding to the pixel is within the area of the directly-under shadow in the sun, and changing the color of the pixel by using the density s2b of the directly-under shadow when the position corresponding to the pixel is within the area of the directly-under shadow in the shade. Thus, the processor 81 may execute the process of rendering the diagonal shadow in the game image and the process of rendering the directly-under shadow in the game image, separately from each other.

In step S19, the processor 81 determines whether or not all the pixels have been selected in the process loop of steps S10 to S19 in the current image generating process. When the determination result in step S19 is negative, the process in step S10 is executed again. Thereafter, the processes in the process loop of steps S10 to S19 are repeatedly executed until the determination result in step S19 becomes positive. When the determination result in step S19 is positive, the processor 81 ends the image generating process in FIG. 15.

Referring back to FIG. 14, in step S3, the processor 81 causes a display device to display the game image generated in step S2. That is, the processor 81 reads out the pixel data from the storage medium, and causes the display device to display the game image indicated by the pixel data. The game image may be displayed on any display device. Although in the exemplary embodiment, the game system 1 displays the image on the display 12, the game system may display the image on another display device (e.g., a monitor connected to the main body apparatus 2) different from the display 12. Next to step S3, the process in step S4 is executed.

In step S4, the processor 81 determines whether or not to end the game. For example, the processor 81 determines whether or not an instruction to end the game has been made by the user. When the determination result in step S4 is negative, the process in step S1 is executed again. Thereafter, the series of processes in steps S1 to S4 are repeatedly executed until it is determined to end the game in step S4. When the determination result in step S4 is positive, the processor 81 ends the game processing shown in FIG. 14.

4. Functions and Effects of Exemplary Embodiment, and Modifications

As described above, in the exemplary embodiment, an information processing program (e.g., the game program) causes a computer of an information processing apparatus (e.g., the main body apparatus 2) to function as the following means.

- Placement means that places an object in a virtual space (step S1).
- First rendering means that, in a first area (e.g., an area in the sun) in the virtual space, renders a first shadow (e.g., a diagonal shadow) and a second shadow (e.g., a directly-under shadow in the sun) as shadows of an object, the first shadow being positioned in a first direction (e.g., a diagonal direction) from the object, the second shadow being positioned in a second direction (e.g., a directly downward direction) different from the first direction, from the object (step S18 in a case where step S15 or step S16 is executed).
- Second rendering means that renders a third shadow (e.g., a directly-under shadow in the shade) as a shadow of the object in a second area (e.g., an area in the shade) darker than a first reference area, the third shadow being positioned in the second direction from the object, the first reference area corresponding to a range, in the first area in the virtual space, in which none of the first shadow and the second shadow are positioned (step S18 in a case where step S14 is executed).

The second rendering means renders the third shadow such that a color difference between a color in a second reference area (e.g., the area of the diagonal shadow 207 of the wall object 206) corresponding to a range, in the second area, in which the third shadow is not positioned, and a color in the area of the third shadow is greater than a color difference between a color in the first reference area (e.g., an area of the ground in the sun) corresponding to a range, in the first area, in which none of the first shadow and the second shadow are positioned, and a color in the area of the second shadow (FIG. 12).

According to the above configuration, the third shadow in the second area darker than the first area can be made easily viewable, thereby improving the visibility of the shadow in the virtual space.

In the above exemplary embodiment, the first area is the area in the sun, and the second area is the area in the shade. That is, the placement means places a shielding object (e.g., the wall object 206) in the virtual space, and the second rendering means renders, as a shadow of the shielding object, a shielding shadow (e.g., the diagonal shadow 207 of the wall object 206) positioned in a third direction from the shielding object. The second area is the area of the shielding shadow of the shielding object. In this case, in the exemplary embodiment, the visibility of the third shadow rendered in the area in the shade can be improved. Furthermore, in the exemplary embodiment, the first direction and the third direction are the same direction. Thus, the shadows (specifically, diagonal shadows) of the object and the shielding object are generated in the same direction, thereby improving the reality of the game image.

In other embodiments, the first direction and the third direction may be different directions. For example, in other embodiments, when a plurality of light sources are set in the virtual space, the first direction may be a direction corresponding to a certain light source, and the third direction may be a direction corresponding to another light source.

In other embodiments, the second area is not limited to the area in the shade, and may be another area. For example, in other embodiments, the first area may be an area of ground having a relatively light color, and the second area may be an area of ground having a color darker than the first area. Also in other embodiments, as in the above exemplary embodiment, the visibility of the shadow can be improved by making the third shadow in the second area easily viewable.

In the exemplary embodiment, the second direction (i.e., the direction in which the second and third shadows are generated with respect to the object) is the directly downward direction. In other embodiments, the second direction is not limited to the directly downward direction. For example, the second direction may be the horizontal direction in the virtual space (e.g., a line-of-sight direction of a virtual camera when the direction of the virtual camera is horizontal). In this case, the second shadow and the third shadow are rendered on a wall surface perpendicular to the horizontal direction in the virtual space. Also in this case, as in the above exemplary embodiment, the visibility of the shadows can be improved. Moreover, the second shadow and the third shadow allow the user to easily grasp the position of the object regarding the direction perpendicular to the second direction.

In the exemplary embodiment, the information processing program is a game program for generating a game image representing a virtual game space. However, the information processing program is not limited to the game program. The process for rendering a shadow according to the exemplary embodiment is applicable not only to games but also to any information processing program for rendering a shadow in a virtual space.

In the exemplary embodiment, when a process is executed by using data (including a program) in a certain information processing apparatus, a part of the data required for the process may be transmitted from another information processing apparatus different from the certain information processing apparatus. In this case, the certain information processing apparatus may execute the process by using the data received from the other information processing apparatus and the data stored therein.

In other embodiments, the information processing system may not include some of the components in the above embodiment, and may not execute some of the processes executed in the above embodiment. For example, in order to achieve a specific effect of a part of the above embodiment, the information processing system only needs to include a configuration for achieving the effect and execute a process for achieving the effect, and need not include other configurations and need not execute other processes.

The exemplary embodiment can be used as, for example, a game system, a game program, and the like, in order to, for example, improve the visibility of a shadow in a virtual space.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium storing instructions that, when executed by a processor of an information processing apparatus, cause the information processing apparatus to perform operations comprising:
    placing an object in a virtual space;
    in a first area in the virtual space, rendering a first shadow and a second shadow as shadows of an object, the first shadow being positioned in a first direction diagonal from the object, and the second shadow being positioned in a second direction downward from the object; and
    rendering a third shadow as a shadow of the object in a second area darker than a first reference area, the third shadow being positioned in the second direction from the object, and the first reference area corresponding to a range, in the first area in the virtual space, in which none of the first shadow and the second shadow are positioned, wherein
        the third shadow is rendered such that a color difference between a color in a second reference area and a color in the area of the third shadow is greater than a color difference between a color in the first reference area and a color in the area of the second shadow, and the second reference area corresponds to a range, in the second area, in which the third shadow is not positioned, and
        the first shadow is rendered by a technique of depth shadowing, and the second shadow and the third shadow are rendered by a technique of capsule shadowing.

2. The non-transitory computer-readable storage medium according to claim 1, wherein the second direction is a direction closer to the downward direction of the virtual space than the first direction.

3. The non-transitory computer-readable storage medium according to claim 1, wherein in the second area, as a shadow of the object, a shadow positioned in the first direction from the object is not rendered.

4. The non-transitory computer-readable storage medium according to claim 1, wherein
    a shielding object is placed in the virtual space,
    as a shadow of the shielding object, a shielding shadow positioned in a third direction from the shielding object is rendered, and
    the second area is an area of the shielding shadow of the shielding object.

5. The non-transitory computer-readable storage medium according to claim 4, wherein the first direction and the third direction are the same direction.

6. The non-transitory computer-readable storage medium according to claim 4, wherein in a case where the object is positioned between the shielding object and the shielding shadow with respect to the first direction, the object is rendered to be darker as compared to a case where the object is not positioned between the shielding object and the shielding shadow with respect to the first direction.

7. The non-transitory computer-readable storage medium according to claim 1, wherein the first shadow is rendered by a first method, the second shadow and the third shadow are rendered by a second method, and the second method makes the shape of the rendered shadow thereby different from the shape of the shadow rendered by the first method, on an assumption that the shadows are rendered in the same direction.

8. The non-transitory computer-readable storage medium according to claim 7, wherein the first method makes the shape of the rendered shadow resemble to the shape of the object, compared to the second method.

9. The non-transitory computer-readable storage medium according to claim 1, wherein the first area and the second area include parts of a ground in the virtual space, and the object moves apart from the ground.

10. The non-transitory computer-readable storage medium according to claim 1, wherein an angle formed between the first direction and a downward direction of the virtual space is greater than 0° and smaller than 90°, and the second direction is the downward direction of the virtual space.

11. The non-transitory computer-readable storage medium according to claim 1, wherein the first shadow is rendered so as to be darker than the second shadow.

12. The non-transitory computer-readable storage medium according to claim 1, wherein the color difference is obtained by color difference formula CIEDE2000.

13. The non-transitory computer-readable storage medium according to claim 1, wherein when the object is placed in a position associated with a sun, the first shadow is rendered more dense compared to the second shadow.

14. The non-transitory computer-readable storage medium according to claim 1, wherein
    the second shadow is rendered in association with the object being placed at a position associated with a sun,
    the third shadow is rendered in association with the object being placed at a position in a shade, and
    a density value of the third shadow is greater than the density value of the second shadow.

15. An information processing system, comprising:
    a processor; and
    a memory configured to store computer readable instructions that, when executed by the processor, cause the information processing system to:
        place an object in a virtual space;
        in a first area in the virtual space, render a first shadow and a second shadow as shadows of an object, the first shadow being positioned in a first direction diagonal from the object, and the second shadow being positioned in a second direction downward from the object; and
        render a third shadow as a shadow of the object in a second area darker than a first reference area, the third shadow being positioned in the second direction from the object, and the first reference area corresponding to a range, in the first area in the virtual space, in which none of the first shadow and the second shadow are positioned, wherein
            the third shadow is rendered such that a color difference between a color in a second reference area and a color in the area of the third shadow is greater than a color difference between a color in the first reference area and a color in the area of the second shadow, and the second reference area corresponds to a range, in the second area, in which the third shadow is not positioned, and the first shadow is rendered by a technique of depth shadowing, and the second shadow and the third shadow are rendered by a technique of capsule shadowing.

16. An information processing apparatus, comprising:

a display; and processing circuitry operatively coupled to the display, wherein the processing circuitry includes at least one processor, and the processing circuitry is configured to:

place an object in a virtual space displayable by the display;

in a first area in the virtual space, render a first shadow and a second shadow as shadows of an object, the first shadow being positioned in a first direction diagonal from the object, and the second shadow being positioned in a second direction downward from the object; and render a third shadow as a shadow of the object in a second area darker than a first reference area, the third shadow being positioned in the second direction from the object, and the first reference area corresponding to a range, in the first area in the virtual space, in which none of the first shadow and the second shadow are positioned, wherein the third shadow is rendered such that a color difference between a color in a second reference area and a color in the area of the third shadow is greater than a color difference between a color in the first reference area and a color in the area of the second shadow, and the second reference area corresponds to a range, in the second area, in which the third shadow is not positioned, and the first shadow is rendered by a technique of depth shadowing, and the second shadow and the third shadow are rendered by a technique of capsule shadowing.

17. An information processing method executed by an information processing system, the information processing method comprising:

placing an object in a virtual space;

in a first area in the virtual space, rendering a first shadow and a second shadow as shadows of an object, the first shadow being positioned in a first direction diagonal from the object, and the second shadow being positioned in a second direction downward, from the object; and rendering a third shadow as a shadow of the object in a second area darker than a first reference area, the third shadow being positioned in the second direction from the object, and the first reference area corresponding to a range, in the first area in the virtual space, in which none of the first shadow and the second shadow are positioned, wherein the third shadow is rendered such that a color difference between a color in a second reference area and a color in the area of the third shadow is greater than a color difference between a color in the first reference area and a color in the area of the second shadow, and the second reference area corresponds to a range, in the second area, in which the third shadow is not positioned, and the first shadow is rendered by a technique of depth shadowing, and the second shadow and the third shadow are rendered by a technique of capsule shadowing.

\* \* \* \* \*